United States Patent [19]

Molian et al.

[11] Patent Number: 5,285,750
[45] Date of Patent: Feb. 15, 1994

[54] LASER CUTTING OF EGGSHELLS

[75] Inventors: P. A. Molian; Jerry L. Hall; M. J. Hsu, all of Ames, Iowa

[73] Assignee: Iowa State University Research Foundation, Inc., Ames, Iowa

[21] Appl. No.: 72,073

[22] Filed: Jun. 7, 1993

[51] Int. Cl.$^5$ .............................................. A01K 29/00
[52] U.S. Cl. ..................................................... 119/174
[58] Field of Search .................. 119/174, 97.1, 6.5, 119/6.6, 6.8

[56] References Cited

U.S. PATENT DOCUMENTS

| | | | |
|---|---|---|---|
| 3,307,600 | 3/1967 | Fuge . | |
| 4,161,366 | 7/1979 | Bol et al. | 356/56 |
| 4,625,728 | 12/1986 | Schonberg | 128/395 |
| 4,681,063 | 7/1987 | Hebrank . | |
| 4,765,337 | 8/1988 | Schonberg | 128/23 |
| 4,903,635 | 2/1990 | Hebrank | 119/6.8 |
| 5,056,464 | 10/1991 | Lewis | 119/6.8 |
| 5,136,979 | 8/1992 | Paul et al. | 119/6.8 |

Primary Examiner—Gene Mancene
Assistant Examiner—Thomas Price
Attorney, Agent, or Firm—Henderson & Sturm

[57] ABSTRACT

Preparation of chicken embryo allantoic fluids for animal health requires opening the eggshell by cutting, drilling or punching methods. Laser cutting and drilling is used as an alternative to known processes. Both $CO_2$ and Nd:YAG lasers are employed. A focused $CO_2$ laser beam at a power of 200 watts in conjunction with an X-Y motion table produced 25 mm diameter "cleancuts" in eggshells with a cutting time of 0.5 seconds per egg. The material removal mechanism was vaporization. When an axicon/lens combination is used with a $CO_2$ laser, the cutting time was further reduced to 0.2 seconds per egg and the mechanism of material removal is changed from vaporization to decomposition of the eggshell into fine powders. Small holes, typical diameters of 0.5 mm to 1 mm are generated in the eggshell using the pulsed Nd:YAG laser.

20 Claims, No Drawings

LASER CUTTING OF EGGSHELLS

TECHNICAL FIELD

This invention relates to machining of eggshells, and more particularly to a method of machining eggshells using lasers.

BACKGROUND ART

Biological industries that produce chicken embryo allantoic fluid from eggs require drilling or punching holes on the top of the egg for inoculation, and cutting for removal of the top of the egg for harvesting the fluid or embryo. Traditionally, holes are drilled in the egg top by a mechanical method using a dental drill. The holes may also be punched by using stainless steel needles. The cuts are made by a thermal process which involves two steps: punch a hole on the egg top, and then place and rotate a propane torch burner over the end of the egg. During mechanical drilling and punching, the forces that act on the tool and on the egg may cause fracture of the egg if the process is not carefully controlled. In addition, the problem of sterility with the drill requires the application of antiseptic fluid. Thermal cutting with the propane torch causes strong heating of the eggshell, generates thermal stresses, and if not controlled properly, results in destruction of the egg. In fact, the rationale for punching a hole prior to propane torch cutting is to eliminate the stresses caused by gas pressure increase inside the egg due to the heating process. Both the mechanical and flame processes have several drawbacks including: sterility, long process time, poor cut quality and high scrap rate.

Those concerned with these and other problems recognize the need for an improved method for machining eggshells.

DISCLOSURE OF THE INVENTION

The present invention provides an alternative to mechanical drilling or punching and propane torch cutting of eggshells—i.e. laser machining. Lasers are used for conventional and exotic applications because of their unique properties—namely, high energy density, monochromaticity and directionality. In addition, the ease of interfacing lasers with computer numerical controls and/or robots allows efficient and cost effective production. A tightly focused laser beam due to its high intensity is capable of melting and evaporating materials with the added benefits of low overall heat transfer, non-contact with the workpiece, high cutting speed and good cut quality. Laser-eggshell interactions, type of laser, energy intensity and material removal mechanisms for efficient cutting and drilling of eggshells are disclosed herein.

An object of the present invention is the provision of an improved method of machining eggshells using lasers.

BEST MODE FOR CARRYING OUT THE INVENTION

1. Choice of lasers and laser-eggshell interactions.

In order to fully understand the laser machining aspects of eggshells, it is important to describe the types of lasers used, identify the composition and structure of the eggshell and study the eggshell interaction with the laser beams.

For cutting and drilling, two types of lasers were used: the $CO_2$ laser, an electrically pumped gas laser that radiates light with a wavelength of 10.6 microns; and the Nd:YAG laser, an optically pumped solid-state laser, that produces light with a wavelength of 1.06 microns. The key characteristics of laser for machining are: power, wavelength, beam quality, and efficiency. $CO_2$ lasers are more powerful in a continuous wave mode than YAG lasers. However, YAG lasers can be operated at high powers in a pulsed mode and can be focused to smaller spot sizes due to its shorter wavelength. $CO_2$ lasers exhibit better beam quality, in terms of $TEM_{oo}$ mode and temporal coherence, compared to YAG lasers. $CO_2$ lasers are also more efficient than YAG lasers (due to poor thermal conductivity of YAG crystals) in converting input energy into output laser energy. An advantage of the YAG over the $CO_2$ laser is that the YAG beam can be transmitted through the quartz fibers (this is relevant to automation of eggshell hole cutting). In general, the YAG and $CO_2$ lasers are used for hole drilling and cutting, respectively.

According to the detailed pioneering studies of eggshell structure, the shell consists of four distinct layers. The outermost layer, called the cuticle, is composed of spheres of organic material with sphere sizes of up to 1 micron in diameter. The total thickness of this layer is about 10 microns. The composition of the cuticle was found to be about 90% protein and 10% carbohydrate. In addition, it may contain some fat and ash up to 5%. The scanning electron microscope has been used to show that the cuticle is highly fissured, dense and free from pores.

The second layer, called the palisade (also called the true shell), constitutes the major portion of egg shell. This layer is about 200 microns thick and consist of calcium carbonate in the form of calcite laid down on an organic matrix (2% by weight of the true shell). The crystal columns run perpendicular to the shell surface. There exists also a cone layer, called the mammillary core, which consists of organic matter and represents seeding sites on which the true shell has crystallized.

The third layer, the outer membrane, is irregular and contains the bases of the mammillary layer. This layer is typically about 40 microns thick. The fourth layer is the inner membrane which is much thinner (10–20 microns) and denser than the outer one. Both membranes consist of a network of fibers lying parallel to the shell surface and are made up of 95% protein, 2% carbohydrate and 3% fat.

The chemical and mineralogical composition of the eggshell is complex and varied. When light interacts with an eggshell, certain wavelengths are preferentially absorbed. Several different processes cause absorption of light and include: electronic, vibrational and rotational transitions in molecules and molecular ions. The absorption spectrum of eggshells produced in the near infrared (IR) region, clearly indicates that reflectance is a major problem in eggshell machining when 1 micron wavelength lasers such as Nd:YAG are used. Absorption spectra of proteins also confirms that the maximum reflectance in an egg shell may occur near the 1 micron wavelength. In contrast, both organics and calcite exhibit an absorption of nearly 90% or better at a wavelength of 10.6 microns characteristic of the $CO_2$ laser.

2. Experimental Details

Both the $CO_2$ and Nd:YAG lasers were employed for machining the eggshell. The beam energy distribution for both lasers was nearly Gaussian. Table 1 provides the data on the laser parameters. No assist gas was used.

For hole drilling, only the YAG laser was used and the beam was transmitted through quartz fibers onto the eggshell. For cutting, two different procedures were used namely conventional laser cutting and an axicon/lens procedure.

(1) Conventional Laser Cutting

This procedure involved a stationary focused laser beam and a moving egg. The eggs were mounted on an X-Y table which in turn was moved by a computer numerical controller (CNC) at speeds from 25 mm/min (10 in/min) to 1250 mm/min (500 in/min). The laser beam was focused on the eggshell through a planoconvex lens.

(2) Axicon-Lens Laser Cutting

This method used a stationary 12.7 mm (0.5") diameter ring beam (obtained through axicon-lens combination) and a stationary egg. Axicon is an optic that is capable of bending the light rays from a point source into a continuous line of points by reflection or refraction or both. The rays from a collimated laser beam are bent by a divergent axicon in combination with a planoconvex lens to form a ring-shaped image on the egg top. In this work, a 127 mm (5") focal length ZnSe lens in conjunction with a 2° ZnSe axicon was used to generate a 12.7 mm (0.5") diameter ring of a $CO_2$ laser beam. The width of the ring was estimated as 0.17 mm on the basis of the diffraction equation given by $w = 1.22\ FC/fa$ where $F$ = focal length of lens, $C$ = velocity of light, $f$ = frequency of laser beam, and $a$ = radius of laser beam. Laser power as a function of cutting time was also studied.

TABLE 1

Laser Types and Parameters Used

| Laser Type | $CO_2$ | Nd:YAG | Nd:YAG |
|---|---|---|---|
| Wavelength | 10.6 | 1.06 | 1.06 |
| Mode | Continuous Wave | Continuous Wave | Pulsed |
| Power, Watts | 200 | 100 | 400 (average) |
| Focused beam size, | 0.25 | 1 mm | 0.1 mm and 1 mm |
| Beam passed through optical fiber | No | Yes | Yes |

3. Results and Discussion a. Conventional Laser Machining

The Nd:YAG laser operating in a continuous wave mode at a power level of 100 watts (intensity = 80,000 W/cm$^2$) was not capable of cutting through the egg top. When the beam was transmitted through the fiber, burning of the fiber tip was experienced and no penetration or cutting on the eggshell was observed. This confirms the poor absorptivity of YAG laser wavelength by the eggshell. Increasing the power level of 400 watts (8 Joules, 50 pps), changing from continuous wave to pulsed mode (1 msec pulses), and focusing the beam through a 75 mm (3") lens to a spot size of 0.1 mm (intensity = $5 \times 10^6$ W/cm$^2$) allowed the YAG beam to cut the eggshell at a rate of 50 mm/min (20"/min).

In contrast to the YAG laser, the $CO_2$ laser at a power of 200 watts in the continuous wave mode was able to cut through the top of the egg at a speed of 1000 mm/min (400"/min) when focused through a 127 mm (5") lens for a spot size of 0.25 mm (intensity = $0.04 \times 10^6$ W/cm$^2$). This demonstrates the increased absorption of $CO_2$ light by the eggshell. The time required for cutting 25 mm (1") diameter hole in the eggshell was about 0.4 sec which is 2.5 times less than the propane torch cutting (1 sec/egg) method currently used. The high density of cracks in the laser-cut surface is attributed to thermal stresses occurring during the cutting process.

The holes required in the top of the egg for injecting the virus fluid are in the range of 1-2 mm in diameter. Since the pulsed laser is most appropriate for drilling, experiments with the pulsed YAG laser were conducted to produce holes in the eggshell. The optimum process parameters were: 400 watts (8 J/msec, 50 pps, 1 msec pulse, 10-15 pulses, focused through 75 mm (3") lens to a spot 0.1 mm and then through fiberoptics). The holes were clean and free of debris.

Laser cutting experiments with a 200 watt $CO_2$ laser beam in conjunction with a X-Y motion table offer the following benefits for egg cutting: non-contact process (important from sterility point of view); no need for a pressure relief hole prior to cutting; all the shell material is evaporated; precise size control; short cutting time compared to propane torch technique; and suitable for automation.

b. Axicon-Lens Combination Laser Cutting $CO_2$ laser cutting experiments with the lens-axicon doublet showed that a power of 200 watts was sufficient to cut a 12.7 mm diameter hole at the top of the egg (intensity = 3000 W/cm$^2$) in a time of 0.2 sec. The material removal mechanism in this method involved the decomposition of calcite into CaO powders leading to the separation of the egg top. This procedure is quite different form that of conventional laser cutting where evaporation is the dominant cutting mechanism. A vacuum system may be used to pull the eggshell and laser cutting debris into a waste receptacle without disturbing the egg contents. The benefits of axicon-lens method are: the hole is cut in the top of egg without moving the laser beam or the egg; and the time is shorter (by a factor of two) than focused beam cutting.

c. Modeling

Several heat energy flow and energy balance models are available to predict the laser cutting process. An energy balance model was considered to verify the observed experimental results because the eggshell, being a mixture of ceramic and organic materials, decomposes or evaporates when irradiated with the laser beam. The following assumptions were made in this analysis:

1. The eggshell is made of 100% calcite.
2. Thermal conduction, convection and radiation away from the cutting zone are negligible.
3. Absorptivity of the eggshell is 0.9 for a $CO_2$ laser and 0.05 for a YAG laser.
4. Energy released from the decomposition of calcite is taken into account. The decomposition of calcite at about 800° C. is:

$$CaCO_3 \rightarrow CaO + CO_2.$$

Heat of reaction = H = 43.8 kcal/mole (1831.6 J/gm).
5. Uniform heating of the eggshell occurs without any lateral heat loss.
6. The laser is a constant power source.

According to the energy balance model,

Absorbed laser energy = Energy for temperature rise + Decomposition energy + Heat of fusion + Heat of Vaporization of the shell $APW/V = m[C_p(T_v - T_o) + H + L_l + L_v]$ where
- A = Absorptivity
- P = Laser Power, Watts
- W = Kerf Width, mm
- V = Cutting Speed, mm/sec
- M = Mass removed, gm
- $C_p$ = Specific Heat, J/gm K
- $T_v$ = Vaporization Temperature, K
- $T_o$ = Ambient Temperature, K
- H = Decomposition Energy, J/gm
- $L_1$ = Latent Heat of Fusion, J/gm
- $L_v$ = Latent Heat of Vaporization, J/gm.

The mass removed, m, is calculated as:

$$m = p(0.785 \ W^2)(t)$$

where
- p = density, $gm/mm^3$
- t = eggshell thickness, mm.

The thickness of eggshell was measured to be 0.25 mm. Thermal properties of $CaCo_3$ and $CaO$ are given in Table 2:

TABLE 2

Selected Properties of CaO and $CaCO_3$

| | CaO | $CaCO_3$ |
|---|---|---|
| Density, $gm/mm^3$ | 3.3 | 2.93 |
| Specific heat, Cal/mole K | 27.8 | 12.8 |
| Melting Temp., K | 2843 | — |
| Heat of Fusion, J/gm | 913 | — |
| Vaporiz, Temp., K | 3123 | — |
| Heat of Vaporiz., J/gm | 10,230 | — |

The results of this simple model are given below for individual cases. The predicted results are in excellent agreement with the experimental data as shown in Table 3.

TABLE 3

| | Cutting, Speed, or Time | |
|---|---|---|
| Machining Procedure | Experimental | Predicted |
| 1. $CO_2$ laser cutting using a focused beam (W = 0.2 mm, P = 200 Watts) | 169.3 mm/s (400 in/min) | 152.4 mm/s (360 in/min) |
| 2. Nd:YAG laser cutting using focused beam (W = 1 mm, P = 400 Watts) | 8.5 mm/s (20 in/min) | 8.63 mm/s (20.4 in/min) |
| 3. Nd:YAG drilling (D = 1 mm, P = 400 watts) | 15 pulses | 14 pulses |
| 4. Axicon-lens $CO_2$ laser cutting (W = 0.4 mm, P = 200 Watts) | 0.20 sec | 0.18 sec |

The experimental study coupled with an energy balance model of laser machining of eggshells demonstrates the effectiveness of $CO_2$ laser for obtaining high quality cuts and holes at high speeds. Laser cutting and drilling provided significant benefits over the existing thermal and mechanical methods.

While only certain preferred embodiments of this invention have been shown and described by way of illustration, many modifications will occur to those skilled in the art and it is, therefore, desired that it be understood that it is intended herein to cover all such modifications that fall within the true spirit and scope of this invention.

We claim:

1. A method of machining an eggshell, comprising the steps of:
   positioning an egg so that a portion of the eggshell is accessible; and
   irradiating an area of the accessible portion of the eggshell with a laser beam until the irradiated area of the eggshell decomposes.

2. The method of claim 1 wherein the laser beam has a wavelength ranging from about 0.01 microns to about 100 microns.

3. The method of claim 2 wherein the laser beam has a wavelength of 1.06 microns.

4. The method of claim 3 wherein the laser beam is emitted from a Nd:YAG laser.

5. The method of claim 2 wherein the laser beam has a wavelength of 10.6 microns.

6. The method of claim 5 wherein the laser beam is emitted from a $CO_2$ laser.

7. The method of claim 1 wherein the irradiation step includes focusing the laser beam on an area of the eggshell ranging from 0.05 the 2.0 millimeters, whereby a hole is formed in the eggshell.

8. The method of claim 7 wherein the laser beam is emitted by a Nd:YAG laser.

9. The method of claim 8 wherein the laser beam is pulsed.

10. The method of claim 9 wherein the pulsed laser beam is transmitted to the area of the eggshell through optical fibers.

11. The method of claim 10 wherein the optical fibers are quartz.

12. The method of claim 1 wherein the irradiation step includes focusing the laser beam on the eggshell and moving the egg so that the laser beam cuts through the eggshell in a closed loop pattern to form an opening.

13. The method of claim 12 wherein the laser beam is emitted form a $CO_2$ laser.

14. The method of claim 13 wherein the laser beam is continuous wave.

15. The method of claim 14 wherein a stationary focused laser beam is focused through a planoconvex lens.

16. The method of claim 15 wherein the egg is positioned on an X-Y table controlled by a computerized numerical controller.

17. The method of claim 1 wherein the irradiation step includes focusing a stationary ring-shaped beam of predetermined diameter on the eggshell of a stationary egg.

18. The method of claim 17 wherein the laser beam is emitted form a $CO_2$ laser.

19. The method of claim 17 wherein the laser beam is a continuous wave.

20. The method of claim 19 wherein the ring beam is formed by directing a collimated laser beam through a axicon-planoconvex lens doublet.

* * * * *